US012567042B2

(12) United States Patent
Baughman et al.

(10) Patent No.: US 12,567,042 B2
(45) Date of Patent: Mar. 3, 2026

(54) NONFUNGIBLE TOKEN PATH SYNTHESIS WITH SOCIAL SHARING

(71) Applicant: International Business Machines Corporation, Armonk, NY (US)

(72) Inventors: Aaron K. Baughman, Cary, NC (US); Sara Perelman, New York, NY (US); Stephen C. Hammer, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 17/820,992

(22) Filed: Aug. 19, 2022

(65) Prior Publication Data

US 2024/0062169 A1 Feb. 22, 2024

(51) Int. Cl.
G06Q 20/06 (2012.01)
G06Q 40/04 (2012.01)
H04L 9/00 (2022.01)

(52) U.S. Cl.
CPC ........... G06Q 20/065 (2013.01); G06Q 40/04 (2013.01); H04L 9/50 (2022.05); *H04L 2209/56* (2013.01)

(58) Field of Classification Search
CPC ........ G06Q 20/065; G06Q 40/04; H04L 9/50; H04L 2209/56
See application file for complete search history.

(56) References Cited

U.S. PATENT DOCUMENTS 9,251,528 B1 2/2016 Mcghie et al.
2011/0153577 A1* 6/2011 Dean ................... G06F 16/2365
707/693

2020/0042989 A1 2/2020 Ramadoss et al.
2021/0209218 A1* 7/2021 Watson ................. H04W 12/06
2021/0256070 A1 8/2021 Tran et al.
2023/0117399 A1* 4/2023 Jakobsson ............ G06Q 50/184
705/310
2024/0411818 A1* 12/2024 Phillips ............... G06F 21/6245

FOREIGN PATENT DOCUMENTS

WO 2019213700 A1 11/2019

OTHER PUBLICATIONS

NPL Search Terms (Year: 2025).*
Hachaj et al., "Eigenfaces-Based Steganography", Entropy, Feb. 25, 2021, 24 pages.

(Continued)

*Primary Examiner* — Syed A Zaidi
*Assistant Examiner* — Amit Khadka
(74) *Attorney, Agent, or Firm* — Cantor Colburn LLP; Kelsey M. Skodje

(57) ABSTRACT

A computer-implemented method includes generating several crypto tokens, each token includes a content portion that is encrypted. For each pair of tokens, a first token and a second token, in response to a correlation score between content portions of the first token and the second token exceeding a predetermined correlation threshold, creating a grid link between the first token and the second token. The tokens are added into a ledger. A group of tokens is created, based on a similarity score. A series of forecasting equations is distributed to the group of tokens. A forecast reveal rate is generated based on the series of forecasting equations, and in response to the forecast reveal rate meeting a forecast threshold, a key is generated for revealing at least one content portions embedded in the group of tokens. The key is released to decrypt the at least one content portion.

20 Claims, 10 Drawing Sheets

(56)        References Cited

OTHER PUBLICATIONS

No Author, "Artificial Intelligence (AI) Market to Hit USD 360.36 Billion by 2028; Surging Innovation in Artificial Internet of Things (AIoT) to Augment Growth: Fortune Business Insights", https://www.globenewswire.com/news-release/2021/09/16/2298078/0/en/Artificial-Intelligence-AI-Market-to-Hit-USD-360-36-Billion-by-2028-Surging-Innovation-in-Artificial-Internet-of-Things-AIoT-to-Augment-Growth-Fortune-Business-Insights.html, Sep. 16, 2021, 10 pages.

No Author, "Steganography And Watermarking", https://www.fi.muni.cz/usr/gruska/crypto18/cr1711.pdf, Apr. 16, 2024, 19 pages.

No Author, "Wimbledon (film)", https://en.wikipedia.org/wiki/Wimbledon_(film), May 28, 2020, 5 pages.

Simrandeep Singh, "A data hiding technique for digital videos using entropy-based blocks selection", Microsystem Technologies, May 13, 2022, 4 pages.

Susnjara et al., "What is blockchain?", https://www.IBM.com/think/topics/blockchain, Jan. 18, 2025, 10 pages.

Anonymous, "The Big Picture: A Big Bet on Crypto," spectrum.ieee.org, Aug. 2021, 2 pages.

Berndt et al., "Provable Secure Universal Steganography of Optimal Rate: Provably Secure Steganography does hot Necessarily Imply One-Way Functions," In Proceedings of the 4th ACM Workshop on Information Hiding and Multimedia Security, 2016, 12 pages.

Chirtoaca et al., "A Framework for Creating Deployable Smart Contracts for Non-fungible Tokens on the Ethereum Blockchain," IEEE International Conference on Decentralized Applications and Infrastructures, 2020, pp. 100-105.

Flowers et al., "Investigating Steganography," Proceedings of the 42nd Annual Southeast Regional Conference, Apr. 2004, pp. 468-469.

Hong et al., "FabAsset: Unique Digital Asset Management System for Hyperledger Fabric," IEEE 40th International Conference on Distributed Computing Systems, 2020, pp. 1269-1274.

Raghavan et al., "Token Tenure and Patch: A Predictive/Adaptive Token-Counting Hybrid," International Symposium on Microarchitecture, 2008, 31 pages.

* cited by examiner

600

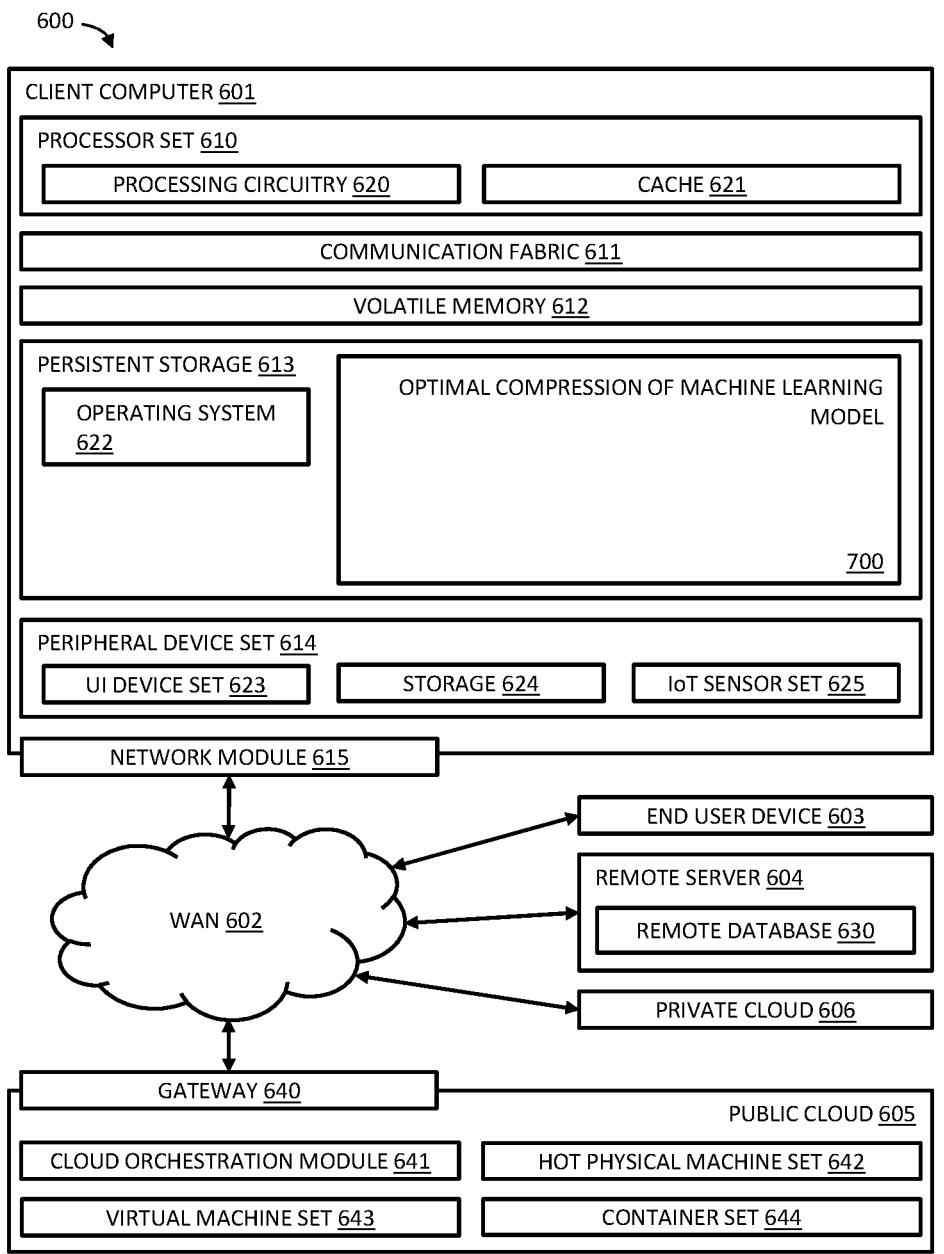

CLIENT COMPUTER 601

PROCESSOR SET 610

PROCESSING CIRCUITRY 620     CACHE 621

COMMUNICATION FABRIC 611

VOLATILE MEMORY 612

PERSISTENT STORAGE 613

OPERATING SYSTEM 622

OPTIMAL COMPRESSION OF MACHINE LEARNING MODEL

700

PERIPHERAL DEVICE SET 614

UI DEVICE SET 623     STORAGE 624     IoT SENSOR SET 625

NETWORK MODULE 615

WAN 602

END USER DEVICE 603

REMOTE SERVER 604

REMOTE DATABASE 630

PRIVATE CLOUD 606

GATEWAY 640

PUBLIC CLOUD 605

CLOUD ORCHESTRATION MODULE 641     HOT PHYSICAL MACHINE SET 642

VIRTUAL MACHINE SET 643     CONTAINER SET 644

FIG. 8

NONFUNGIBLE TOKEN PATH SYNTHESIS WITH SOCIAL SHARING

BACKGROUND

The present invention relates to computer technology, particularly to digital steganography and cryptography where information is encrypted in one or more digital assets, and more particularly to nonfungible token path synthesis with social sharing.

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to record their transactions continuously and sequentially on a public "block," creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

Conventionally, a blockchain enables the exchange of tokens or coins that are part of a cryptocurrency (e.g., bitcoin, Zcash, etc.) Cryptocurrency is designed as a unit of exchange and is used to maintain scarcity of such assets without relying on a central bank to limit supply. Numerous factors can cause cryptocurrency prices to fluctuate (e.g., supply/demand, government, dilution, etc.) Tokens may be used in an exchange for fiat currency, goods, services, etc. However, tokens do not support generic constraints limiting release of value despite specialized constraints that can and have been implemented using signature schemes.

SUMMARY

According to one or more embodiments of the present invention, a computer-implemented method includes generating a plurality of crypto tokens, each crypto token from the plurality of crypto tokens comprising a respective content portion that is encrypted. The method further includes, for each pair of crypto tokens from the plurality of crypto tokens comprising a first crypto token and a second crypto token, in response to a correlation score between content portions of the first crypto token and the second crypto token exceeding a predetermined correlation threshold, creating a grid link between the first crypto token and the second crypto token. The method further includes adding the plurality of crypto tokens into a ledger. The method further includes creating a group of crypto tokens from the plurality of crypto tokens that are added into the ledger, creating the group comprises: for the each pair of crypto tokens after the release onto the ledger, in response to a similarity score between the first crypto token and the second crypto token exceeding a predetermined similarity threshold, and the first crypto token and the second crypto token being connected by the grid link. The method further includes distributing a series of forecasting equations to the group of crypto tokens. The method further includes generating a forecast reveal rate based on the series of forecasting equations. The method further includes, in response to the forecast reveal rate meeting a forecast threshold, generating a key for revealing at least one content portions embedded in the group of crypto tokens. The method further includes releasing the key to decrypt the at least one content portion.

According to one or more embodiments of the present invention, a system includes a memory, and a processor coupled to the memory, the processor configured to perform a method. The method includes generating a plurality of crypto tokens, each crypto token from the plurality of crypto tokens comprising a respective content portion that is encrypted. The method further includes, for each pair of crypto tokens from the plurality of crypto tokens comprising a first crypto token and a second crypto token, in response to a correlation score between content portions of the first crypto token and the second crypto token exceeding a predetermined correlation threshold, creating a grid link between the first crypto token and the second crypto token. The method further includes adding the plurality of crypto tokens into a ledger. The method further includes creating a group of crypto tokens from the plurality of crypto tokens that are added into the ledger, creating the group comprises: for the each pair of crypto tokens after the release onto the ledger, in response to a similarity score between the first crypto token and the second crypto token exceeding a predetermined similarity threshold, and the first crypto token and the second crypto token being connected by the grid link. The method further includes distributing a series of forecasting equations to the group of crypto tokens. The method further includes generating a forecast reveal rate based on the series of forecasting equations. The method further includes, in response to the forecast reveal rate meeting a forecast threshold, generating a key for revealing at least one content portions embedded in the group of crypto tokens. The method further includes releasing the key to decrypt the at least one content portion.

According to one or more embodiments of the present invention, a computer program product includes a memory device with computer-executable instructions therein, the computer-executable instructions when executed by a processing unit perform a method. The method includes generating a plurality of crypto tokens, each crypto token from the plurality of crypto tokens comprising a respective content portion that is encrypted. The method further includes, for each pair of crypto tokens from the plurality of crypto tokens comprising a first crypto token and a second crypto token, in response to a correlation score between content portions of the first crypto token and the second crypto token exceeding a predetermined correlation threshold, creating a grid link between the first crypto token and the second crypto token. The method further includes adding the plurality of crypto tokens into a ledger. The method further includes creating a group of crypto tokens from the plurality of crypto tokens that are added into the ledger, creating the group comprises: for the each pair of crypto tokens after the release onto the ledger, in response to a similarity score between the first crypto token and the second crypto token exceeding a predetermined similarity threshold, and the first crypto token and the second crypto token being connected by the grid link. The method further includes distributing a series of forecasting equations to the group of crypto tokens. The method further includes generating a forecast reveal rate based on the series of forecasting equations. The method further includes, in response to the forecast reveal rate meeting a forecast threshold, generating a key for revealing at least one content portions embedded in the group of crypto tokens. The method further includes releasing the key to decrypt the at least one content portion.

According to one or more examples, creating the grid link between the first crypto token and the second crypto token comprises embedding an identifier of the second crypto token in the first crypto token, and embedding an identifier of the first crypto token in the second crypto token.

According to one or more examples, the first crypto token is further embedded with an adjacency encoding and multiple parts of the content portion.

According to one or more examples, the key to decrypt the at least one content portion is released as a crypto token.

According to one or more examples, the content portion of the first crypto token comprises a first prediction about an event from a first user.

According to one or more examples, the series of forecasting equations are used to compute and assign a forecasting distance to each pair of crypto tokens in the group of crypto tokens, the forecasting distance between a pair is inversely proportional to the similarity score between the pair.

According to one or more examples, the forecast reveal rate for the group of crypto tokens is computed by combining the forecasting distance of each pair of crypto tokens in the group of crypto tokens, the combining performed based on a Runge-Kutta method.

Embodiments of the invention described herein address technical challenges in computing technology, particularly in digital steganography by facilitating encrypting information (e.g., predictions), in the form of nonfungible tokens ("tokens," "crypto tokens"), creating a grid of several such tokens, and adding the tokens into a Cryptographic Distributed Ledger (CDL), Further, embodiments of the present invention facilitate releasing the encrypted information embedded in a particular token based on machine learning by determining similarity and grouping of the tokens. Further, one or more embodiments of the present invention provide a practical application for deploying distributed forecasting using digital steganography based on a CDL.

Embodiments of the present invention can provide practical application in several fields such as information/content release and/or consumption (e.g., predictions, media, news, fantasy sports (i.e., rotisserie or roto games like fantasy football), etc.). Today, content (e.g., images, articles, videos, audios, etc.) is immediately available, consumed, and archived for potential future use. Typically, the production of content is not a social activity. The production of the content is usually from subject matter experts or news outlets with reporters. A producer then puts the information together. Embodiments of the present invention facilitates generating content using social activity by facilitating several users to provide respective input related to the content, and releasing particular inputs dynamically to be incorporated into the content to be created. Accordingly, embodiments of the present invention facilitate a dynamic, social content generation. Further, in one or more embodiments of the present invention, the embodiments of the present invention facilitate creation of content at runtime based on occurrence (or non-occurrence) of one or more predicted events.

Embodiments of the present invention facilitate persisting the value of information and increases the longevity of an information's worth. In one or more embodiments of the present invention, value of the information increases at specific points in time with the use of steganography. Further, one or more embodiments of the present invention facilitate timing the release of portions of the content using a combination of nonfungible tokens, artificial intelligence, and cryptography, among other computer rooted technologies. Embodiments of the present invention facilitate creating a grid of nonfungible tokens that are generated to store a portion of the content. The portion is stored in the nonfungible token as a hidden portion using steganography, for example, cryptography. In one or more embodiments of the present invention, specific portions of the content are kept hidden (not released) until specific conditions have occurred.

Embodiments of the present invention accordingly provide improvements to computer rooted technology, such as cryptography, blockchain, nonfungible tokens, and smart contracts. Embodiments of the present invention also provide practical applications of using techniques rooted in computer technology and to improve fields/applications such as steganography, encryption, creating digital content in a social-interactive manner, releasing predictions/content portions digitally based on one or more conditions. Several other technical fields can also be improved using one or more embodiments of the present invention. Embodiments of the present invention facilitate use of nonfungible tokens for live events such as a sports tournament (e.g., WIMBLEDON®, MASTERS®, etc.), operas, theatrical shows, award ceremonies (e.g., GRAMMYS®, OSCARS®, etc.), etc. We are also exploring the use of using NFT's for ticket access into different hospitality suites.

Embodiments of the present invention provide a distributed prediction of neighboring steganographic revealing (i.e., releasing). Embodiments of the present invention also facilitate revealing steganographic nonfungible tokens key(s) based on neighboring reveals. Embodiments of the present invention facilitate hiding of predictions within nonfungible tokens, and revealing such predictions during peak excitement before nonfungible steganographic expiration. Embodiments of the present invention use grid linking of nonfungible tokens to produce/create a story/content in a social/interactive/distributed manner using content portions from several distinct sources. Embodiments of the present invention further provide time sequence steganographic reveal of content within a nonfungible token grid.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings.

FIG. 8 depicts a computing environment in accordance with one or more embodiments of the present invention.

Figure 1:
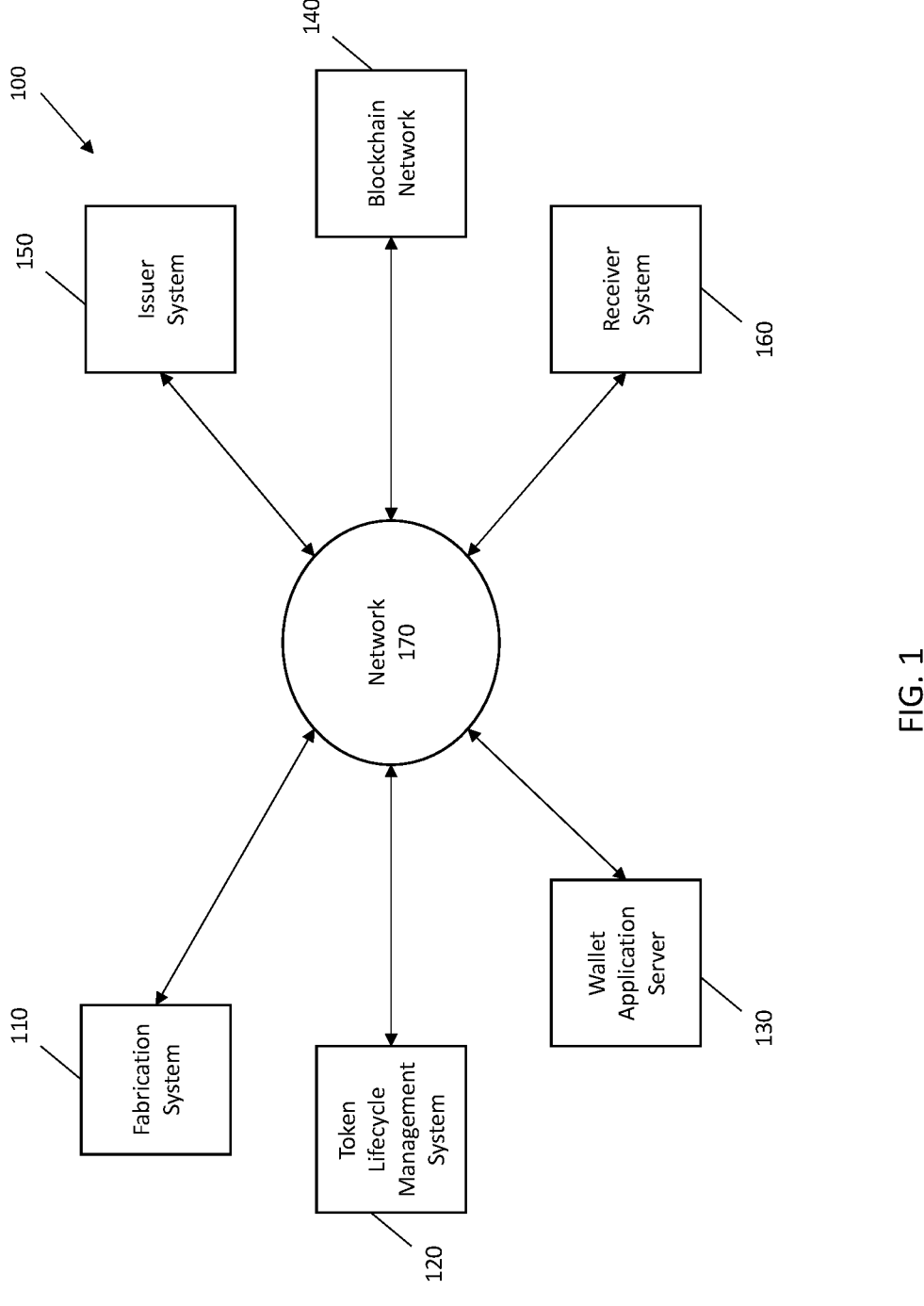
FIG. 1 illustrates a network environment for creating and enforcing a bespoke programmable crypto token, according to embodiments of the present invention.

The diagrams depicted herein are illustrative. There can be many variations to the diagrams, or the operations described therein without departing from the spirit of the invention. For instance, the actions can be performed in a differing order, or actions can be added, deleted, or modified. Also, the term "coupled," and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Embodiments of the invention described herein address technical challenges in computing technology, particularly in digital steganography by facilitating encrypting information (e.g., predictions), in the form of nonfungible tokens ("tokens," "crypto tokens"), creating a grid of several such tokens, and adding the tokens into a Cryptographic Distributed Ledger (CDL), Further, embodiments of the present invention facilitate releasing the encrypted information embedded in a particular token based on machine learning by determining similarity and grouping of the tokens. Further, one or more embodiments of the present invention provide a practical application for deploying distributed forecasting using digital steganography based on a CDL.

Embodiments of the present invention can provide practical application in several fields such as information/content release and/or consumption (e.g., predictions, media, news, fantasy sports (i.e., rotisserie or roto games like fantasy football), etc.). Today, content (e.g., images, articles, videos, audios, etc.) is immediately available, consumed, and archived for potential future use. Typically, the production of content is not a social activity. The production of the content is usually from subject matter experts or news outlets with reporters. A producer then puts the information together. Embodiments of the present invention facilitates generating content using social activity by facilitating several users to provide respective input related to the content, and releasing particular inputs dynamically to be incorporated into the content to be created. Accordingly, embodiments of the present invention facilitate a dynamic, social content generation. Further, in one or more embodiments of the present invention, the embodiments of the present invention facilitate creation of content at runtime based on occurrence (or non-occurrence) of one or more predicted events.

Content can be created using linear or non-linear storytelling. "Linear storytelling" is presenting on a topic in sequential or chronological manner. Linear storytelling also does not incorporate any audiences' participation during the process. "Nonlinear narrative" (sometimes also referred to as "disjointed narrative" or "disrupted narrative") is a narrative technique in which events are portrayed out of chronological order. Content delivery can be provided through push and pull notifications that are targeted to groups of people or individuals. Here, when the content is "provided," it refers to the release of the stream of information, which is available for consumption. In some circumstances, the content can include information that is quoted, referenced, or attributed within other content. However, all or parts of the information that is being consumed by a consumer may not be owned by the consumer. When new information is created, and content containing such new information is released, a consumer either pulls or a broadcaster pushes the latest content for the consumer's usage. Here, content can contain text, image, video, audio, or any other type of elements or a combination thereof. The content can represent portions of a media, for example, an audio, video, book, website, game, or any other such digital content. Alternatively, or in addition, the content can represent inputs from one or more users, such as reviews, predictions, messages, or any other such content. The content can be provided by a sole source (e.g., producer, content house, etc.) or from multiple sources (e.g., users, social media, etc.). the several sources and types of content listed above are examples, and should not be considered as a limited list of attributes for one or more embodiments of the present invention. Further, above listed attributes, sources, etc. of the content can be combined in one or more embodiments of the present invention.

As might be noted elsewhere herein, content can be made immediately available, consumed, and archived for potential future use, particularly in the digital content field, such as video, audio, text, etc. In addition, the production of the content is not a social activity. Rather, the production of the content is usually from subject matter experts, news outlets with reporters, artists, production houses, etc. Typically, a producer (or production house) puts the content together by combining one or more sources of information to generate a stream or file of content, such as a book, an audio book, a web series, etc. Typically, the content in this manner is released or made available instantly and, in its entirety, based on broad rules. After the information is consumed, the content may be archived. Typically, once the information is consumed, the content loses value and is either discarded or archived.

Embodiments of the present invention facilitate persisting the value of information and increases the longevity of an information's worth. In one or more embodiments of the present invention, value of the information increases at specific points in time with the use of steganography. Further, one or more embodiments of the present invention facilitate timing the release of portions of the content using a combination of nonfungible tokens, artificial intelligence, and cryptography, among other computer rooted technologies. Embodiments of the present invention facilitate creating a grid of nonfungible tokens that are generated to store a portion of the content. The portion is stored in the nonfungible token as a hidden portion using steganography, for example, cryptography. In one or more embodiments of the present invention, specific portions of the content are kept hidden (not released) until specific conditions have occurred.

For example, each piece of information within a nonfungible token (NFT, crypto token, or simply "token") has hidden content that can be unlocked based on a shifting window. The window can be defined based on time, or any other condition that can be associated with the tokens. Accordingly, the window releases one or more portions of the embedded information from the original information that is stored on the tokens based on the conditions associated with the window. The information can be of the form of a prediction such that the value of the information expires after the time period of the prediction elapses.

Each token with hidden content can be linked with other tokens to produce a story based on the conditions. For example, a token grid can be populated with individual tokens that have hidden messages, where the messages are provided via one or more social media (e.g., TWITTER®, FACEBOOK®, INSTAGRAM®, etc.) by respective users. Social interaction can put the story assembly and production into the hands of the users creating the tokens.

As used herein, a "crypto token," "nonfungible token" or "NFT" or "token" is a non-interchangeable unit of data (unique) stored on a digital ledger, such as a blockchain, that can be transacted, e.g., sold, bought, traded using a smart contract. A "smart contract" is a self-executing contract with the terms of the agreement between two parties, e.g., buyer and seller, being directly written into lines of code. In other words, the smart contract is a computer program, i.e., computer executable instructions, which define the terms of the agreement between the two parties. A "crypto-anchor" is a unique identifier that can be associated with an entity, e.g., a product, a website, a media object, etc., which cannot be removed/changed, and which is connected to the ledger, e.g., a blockchain. The crypto-anchor can be an identifier, such as a machine-readable code (e.g., quick response (QR) code, barcode, etc.) a text, an image, etc. "Ethereum" is a decentralized, open-source blockchain with smart contract functionality and "Ether" is native cryptocurrency of the platform. It is understood that other types of blockchain, cryptocurrency, and terms may be used to describe one or more embodiments of the present invention, and the examples herein should not be construed to limit aspects of the present invention.

Further, embodiments of the present invention also use techniques of steganography, which is the practice of hiding content, such as a message, in a host entity, such as a picture, a media content, a text, or any other such entity that is not secret, without altering how the host entity appears to its users.

Embodiments of the present invention accordingly provide improvements to computer rooted technology, such as cryptography, blockchain, nonfungible tokens, and smart contracts. Embodiments of the present invention also provide practical applications of using techniques rooted in computer technology and to improve fields/applications such as steganography, encryption, creating digital content in a social-interactive manner, releasing predictions/content portions digitally based on one or more conditions. Several other technical fields can also be improved using one or more embodiments of the present invention. Embodiments of the present invention facilitate use of nonfungible tokens for live events such as a sports tournament (e.g., WIMBLEDON®, MASTERS®, etc.), operas, theatrical shows, award ceremonies (e.g., GRAMMYS®, OSCARS®, etc.), etc. We are also exploring the use of using NFT's for ticket access into different hospitality suites.

Embodiments of the present invention provide a distributed prediction of neighboring steganographic revealing (i.e., releasing). Embodiments of the present invention also facilitate revealing steganographic nonfungible tokens key(s) based on neighboring reveals. Embodiments of the present invention facilitate hiding of predictions within nonfungible tokens, and revealing such predictions during peak excitement before nonfungible steganographic expiration. Embodiments of the present invention use grid linking of nonfungible tokens to produce/create a story/content in a social/interactive/distributed manner using content portions from several distinct sources. Embodiments of the present invention further provide time sequence steganographic reveal of content within a nonfungible token grid.

One or more embodiments of the present invention can be used in conjunction with an artificial intelligence based system such as IBM BLOCKCHAIN™, THE AI LADDER™, or any other such systems/services to improve such systems/services or to facilitate such systems/services to be used to provide a practical application.

Example embodiments of the present invention provide methods, systems, non-transitory computer readable media, devices, and/or networks, which provide a programmable crypto token, (also referred to as crypto asset, nonfungible token, token) which can be modified with constraints, conditions, etc., and may have a value (also referred to as a crypto credit) that is only be redeemable or released upon the occurrence of such constraints, conditions, etc. The credit may be based on a content that is stored within the crypto token in one or more embodiments of the present invention. Accordingly, releasing the crypto credit includes releasing the content in one or more embodiments of the present invention. Enforcement of the release may be governed by a smart contract on a blockchain peer node. The crypto token may be wrapped (programmed) with various bespoke conditions therein, in contrast to the conditions being verified by users. Such bespoke conditions of the crypto token may be updated dynamically. A blockchain network may only release the underlying crypto credit/content of the crypto token when the conditions identified based on the bespoke programmable instructions of the crypto token have been satisfied.

Distributed ledger technology utilizing decentralized (peer-to-peer), distributed data structure (ledger) technology (blockchain) provides the basis for tools that can be used as described herein to increase a velocity of transactions, such as monetary transactions, release of content, etc., in a supply chain. In particular, this can be accomplished by utilizing blockchain to create bespoke programmable credit crypto-assets that can be tailored to the idiosyncratic needs of an extended supply chain and its members, or other types of receivers of the crypto tokens. Unlike a cryptocurrency (e.g., such as a coin) the bespoke crypto token may not have intrinsic value but is a promise to pay/fulfill an obligation (e.g., transfer of money, goods, services, content, etc.) upon one or more conditions identified from programmable instructions within the crypto token being satisfied.

Embodiments of the present invention support a blockchain solution that provides the ability to generate and exchange programmable crypto tokens. Crypto tokens have traditionally been used as programmable money carrying units of value. In contrast, the technical solution of the bespoke crypto token is that the token can be programmed itself with a series of constraints or conditions. These constraints, whatever they may be, can be read and enforced by a smart contract, for example to enable redemption for a cash payment. Some of the benefits of such a solution provide for tokens with uniquely tailored value that is tied to a particular activity, holder/receiver, owner, and the like, thereby enabling customized and extremely secure release of information.

To program a token with conditions/constraints, the conditions/constraints may be written to the token data structure. As another example, the token data structure may be embedded with a link, which may be a hash, to an on-chain or off-chain database. The embodying system may include a fabrication system, a system for the token lifecycle (e.g., creation, distribution, destruction, etc.), a wallet application, and a blockchain.

In some embodiments of the present invention, the programmable instructions of the crypto token may be securely and dynamically updated. For example, the issuer of the token may change a parameter and cause the bespoke programmable crypto token to be dynamically updated with this new parameter within the token data structure. For example, the parameter can include a release time of the content, the content itself, or other such parameters. Here, an entity such as the fabrication system, a smart contract, a content creation system, or the like, may automatically detect and submit a request to the blockchain identifying the crypto token and the updated parameter. Prior to recording the change within the blockchain, the blockchain network may authenticate the entity to ensure security, the parameter being updated, etc., and make the change to the bespoke programmable crypto token to include the updated feature. The updated crypto token may be stored on a new block within the blockchain.

Blockchain is different from a traditional database in that blockchain is not a central storage but a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the bespoke programmable crypto token is implemented using a smart contract and a decentralized/distributed scheme which are inherent and unique to blockchain.

In particular, the conditioning of the release of a content or a portion thereof from the crypto token may be enforced upon the occurrence of one or more constraints and/or conditions being satisfied. However, rather than the constraints or conditions being written into the deterministic logic of an external application, such as a smart contract, the constraints or conditions are embedded within instructions programmed within the crypto token or programmed within a storage which is linked through programmable instructions within the crypto token which can be read by issuers, recipients, smart contracts, and third parties depending upon privacy constraints, and verified by reference to the blockchain. The crypto token facilitates timing the release of content portions in the crypto token based on such conditions/constraints, and in so doing increase the ability to dynamically create content (using the released content portions), through programmable credit crypto-assets. In doing so, the programmable release of content can facilitate maintaining value of content portions that have yet to be released in response to a given occurrence being read by a smart contract.

Meanwhile, a traditional database could not be used to implement the embodiments of the present invention because crypto tokens require a blockchain for decentralized distribution and for exchange and verification. Furthermore, the bespoke programmable crypto token comes alive through a smart contract which is not present within a traditional database.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of diverse types can run on the same physical server. Nodes are grouped in trust domains and are associated with logical entities that control them in numerous ways. Nodes may include diverse types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions, and maintain a state and a copy of the ledger of blockchain transactions. Peers can also have the role of an endorser, although it is not a requirement. An ordering-service-node or "orderer" is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1 illustrates a network environment 100 for creating and enforcing a bespoke programmable crypto token, according to embodiments of the present invention. Referring to FIG. 1, the network environment 100 may include a fabrication system 110 for creating new crypto tokens, a crypto token lifecycle management system 120 for monitoring and managing lifecycle events such as creation, distribution, destruction, and the like, of the crypto tokens, a wallet app server 130 for displaying crypto token account balances in both the issuer and receiver accounts and reading token parameters, a blockchain network 140 for storing and exchanging crypto tokens, an issuer system 150 and a receiver system 160 (e.g., supply chain, etc.) which may be a receiver of a crypto token of the issuer system 150 stored in a digital wallet managed by wallet app server 130.

In an implementation of the system, an issuing enterprise such as the fabrication system 110 may create a class of bespoke, parameterized crypto tokens that represent content to be delivered to the receiver 160. In one or more embodiments of the present invention, the crypto token also promises to pay the issuer 150. The crypto tokens may be a promise to release content upon the verification of one or more conditions wrapped within the programmable instructions of the crypto token. The issued crypto tokens may be created by the fabrication system 110 and received, stored, and further distributed by entities such as the issuer system 150 and the receiver system 160 utilizing a crypto-wallet hosted by wallet app server 130. Through the wallet, the receiver can read the identity of the issuing enterprise, the balances of classes of crypto tokens that it holds, and their respective parameters.

The crypto token lifecycle management system 120 may monitor and track progress and changes to a bespoke crypto token. For example, the crypto token lifecycle management system 120 may store information about who currently has control over the crypto token, who provided the token, constraints associated with the token, an expiry of the token, and the like. Furthermore, the crypto token lifecycle management system 120 may also trigger the destruction of the crypto token at the end of its lifecycle.

The programmable instructions, credit parameters, and/or the content stored in the crypto token provide its provenance, vintage, and associated terms and conditions, including: who can present the crypto token for redemption, how and when can presentment be accomplished, can it be redeemed for cash, and if so, in what currency, can the value upon redemption be limited to a specific geography, is redemption limited to specified goods and services, can the crypto-credit be transferred to a third party with the same rights as the initial recipient, or is transfer allowed only for a specific purpose, is there an expiration date for the content, what law applies and what are the dispute resolution mechanisms, when can the content be released, to whom the content can be released, if the release of the content is based on the release of another content, and the like.

The parameters can be stored in the token itself, or may be stored in an on-chain or off-chain database referenced by a hashed identifier stored within the token. In either case, the programmable instructions provide either the parameters themselves or a direct link to a storage holding the parameters. Once created, crypto token ownership data, including transfers, are recorded in the blockchain 140. The transparency of the blockchain 140 allows the original issuer to track and trace the flow and number of crypto tokens across a supply chain. By design, the issuer 150 can enable other parties in the supply chain to do the same. This transparency can be limited to supply chain members, or can be extended to the public, depending upon how the issuer 150 chooses to build privacy and confidentiality into the blockchain design.

To enforce rules, the issuer 150 may utilize tools, such as multi-signature wallets, to block others from holding the crypto tokens or freeze further transfer. Additional rules can be enforced through the use of deterministic logic stored in the blockchain 140, referred to as a "smart contract" or chaincode. This enables, for example, the issuer 150 to limit use of a crypto tokens to release content, pay a third party (e.g., receiver 160, etc.) supplying a quantity of a particular item. The supplier invoice, as read by the smart contract, can trigger the release of the crypto token, i.e., the content stored in the crypto token. In one or more embodiments of the present invention, the content may be released in response to a payment. Additional logic may allow the third party to factor the crypto tokens and transfer it to others. The release may make the crypto token exchangeable or otherwise redeemable for fiat currency, goods, services, etc.

Figure 2A:
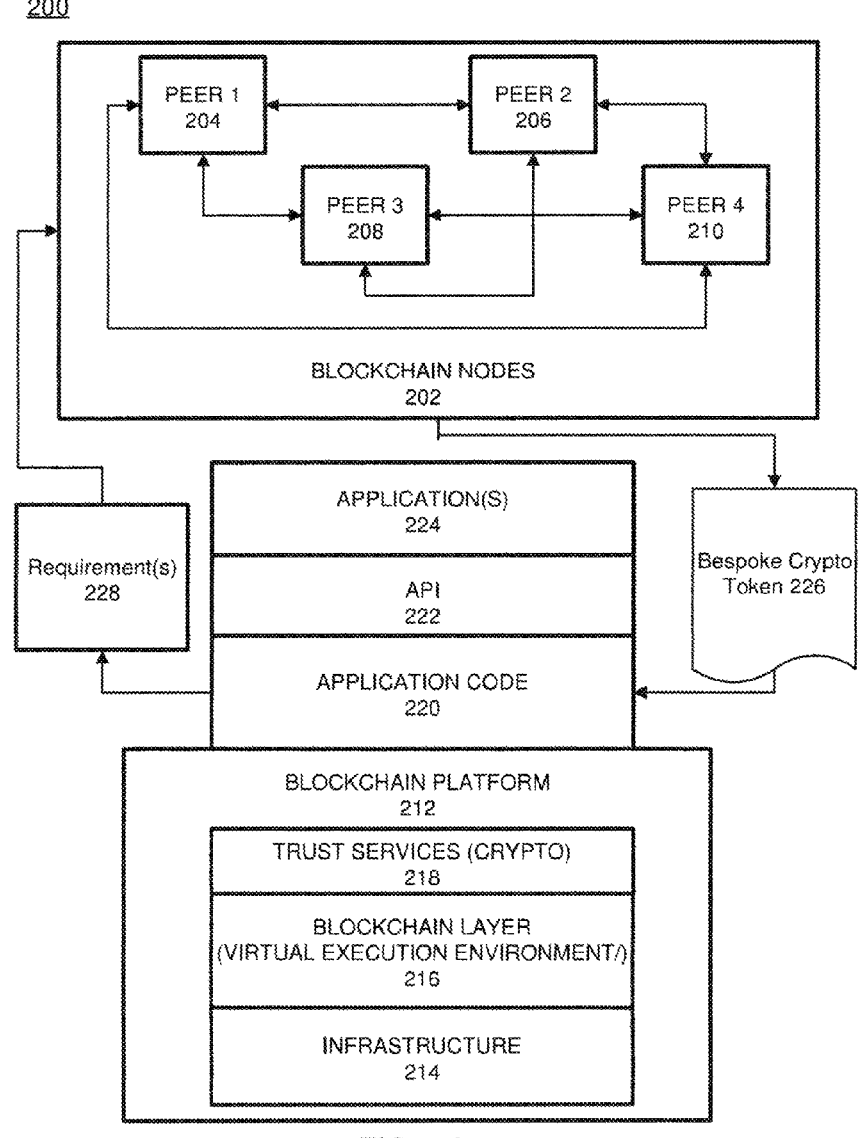
FIG. 2A illustrates a blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, bespoke programmable crypto token 226 may be processed by one or more processing entities (e.g., virtual machines) included in the blockchain layer 216. One or more requirements 228 (e.g., conditions, requirements, parameters, etc.) may be read from the programmable crypto token 226. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
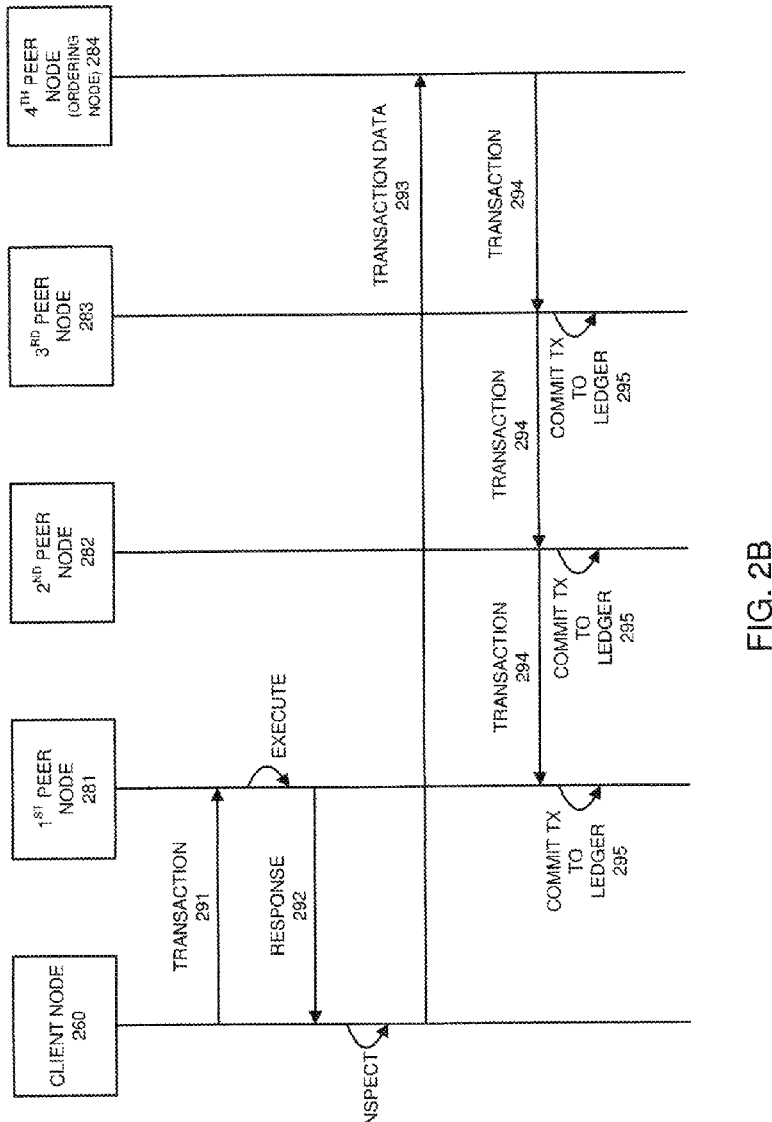
FIG. 2B illustrates an example of a transactional flow between nodes of the blockchain in accordance with an example embodiment.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peer's signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peer's signatures, and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

In one or more embodiments of the present invention, a blockchain user may submit a transaction to the permissioned blockchain network 140. The transaction can be a request to create, store, destroy, modify, etc., a bespoke programmable crypto token 226. The transaction may be issued through a client-side application leveraging an SDK, directly through a REST API, or the like.

Figure 3A:
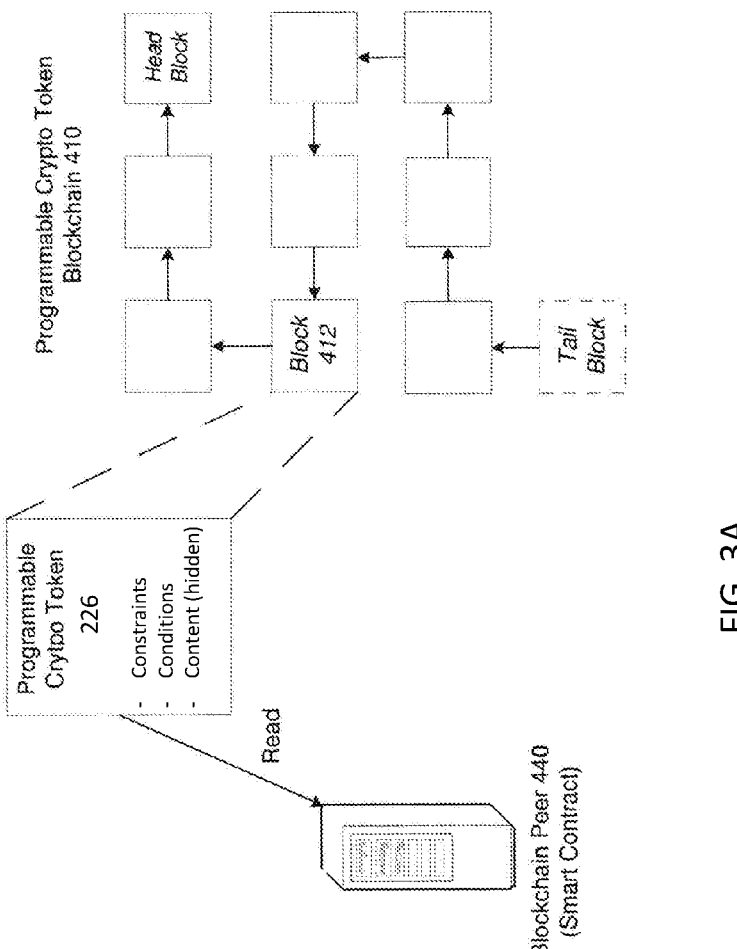
FIG. 3A illustrates a process of a blockchain peer determining whether conditions of a bespoke programmable crypto token have been satisfied, according to example embodiments.
Figure 3B:
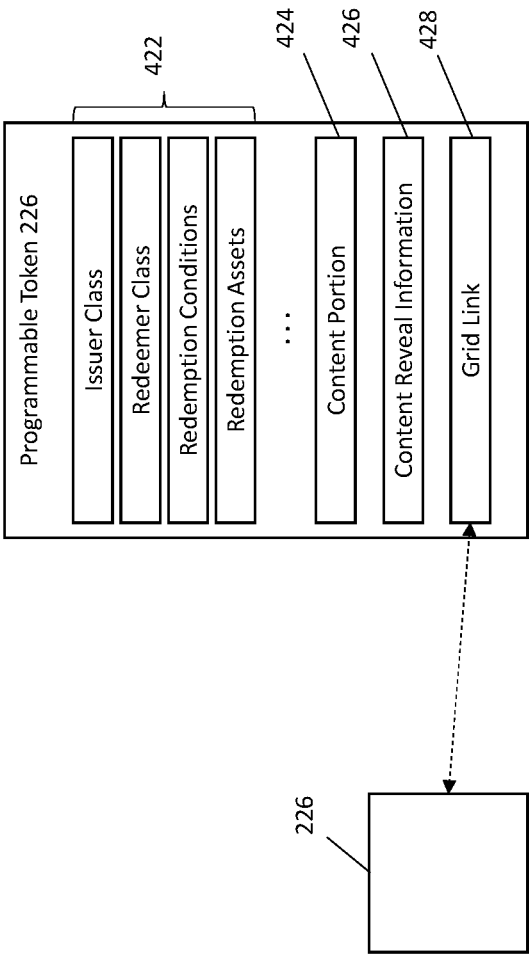
FIG. 3B illustrates an example of programmable instructions which may be embedded within or otherwise linked to the bespoke programmable crypto token.

FIG. 3A illustrates a process 400 of a blockchain peer 440 determining whether conditions of a bespoke programmable crypto token 226 have been satisfied, according to example embodiments, and FIG. 3B illustrates an example of programmable instructions which may be embedded within or otherwise linked to the bespoke programmable crypto token 226. According to various embodiments, one or more users may create and issue a unique class of bespoke, parameterized crypto tokens 226 that represent an obligation of the creator(s) to the receiver, the obligation to release one or more portions of content associated with the crypto tokens 226. The parameters, which represent conditions or constraints on the promise to release the content, can be written to the internal data structure of the crypto token, or to an on- or off-chain database with a linking identifier, e.g., a hash of the constraints, written to the data structure of the crypto token 226.

The creators may distribute the crypto token 226 to a receiver and the transaction may be recorded in a blockchain 410 and reflected in crypto wallet balances. Here, the blockchain 410 includes a hash-linked chain of blocks where each subsequent block contains a hash link (pointer) to an immediately previous block in the blockchain. As transactions are recorded, the links are created making each transaction immutable. In this example, the crypto token 226 and its transaction details may be recorded in data block 412 of the blockchain 410. When the receiver submits a proof of performance of an activity (e.g., a sale, an exchange, etc.) in the form of a provable item such as a receipt, a document, an invoice, etc., the blockchain peer 440 may compare content within the proof of performance to the constraints identified/read based on the programmable instructions within the crypto token 226. When the constraints are satisfied, the blockchain peer 440 may release or otherwise make public (e.g., set a flag, bit, etc.) to indicate that a content (hidden) of the crypto token 226 is now accessible. As another example, the blockchain peer 440 may release the actual content (hidden) to the receiver.

To enforce rules, the issuer may utilize tools, such as a smart contract on blockchain peer 440 and multi-signature wallets to block others from holding the crypto tokens or freeze further transfer. In some embodiments, the creators may limit use of a crypto token issued to a particular receiver to release the content only to particular third party. Here, the invoice is submitted to the smart contract of the blockchain peer 440, which reads the parameters stored in the crypto token 226 or an on-chain or off-chain database and decides whether to allow a transfer of the crypto token 226 to the third party. If redemption is allowed, the smart contract may settle by transferring funds to the third-party supplier and destroying the token. As another example, the smart contract may release or unlock a value of the crypto token 226 (otherwise making the token exchangeable for value/assets). Furthermore, all token events may be written to the blockchain 410.

In some embodiments, the programmable instructions of the crypto token 226 may be securely and dynamically updated. For example, the issuer of the crypto token 226 may change a forecast (release time) parameter (or any other parameter such as shown in FIG. 3B) and cause the bespoke programmable crypto token 226 to be dynamically updated with this new parameter within the token data structure. Here, an entity such as the fabrication system, a smart contract, a banking system, or the like, may automatically detect and submit a request to the blockchain 410 identifying the crypto token and the updated parameter. Prior to recording the change within the blockchain 410, the blockchain network may authenticate the entity to ensure security, the parameter being updated, etc., and make the change to the bespoke programmable crypto token to include the updated feature. The updated crypto token may be stored on a new block within the blockchain 410.

FIG. 3B illustrates an example of programmable content of a bespoke programmable crypto token 226 according to example embodiments. It should be appreciated that the content of the crypto token 226 is merely for purposes of example and is not limited to the programmable data shown in FIG. 3B. In one or more embodiments of the present invention, the crypto token 226 uses one or more protocols that provide standardized requirements for a crypto token. For example, such protocols can include ERC-721, ERC-1155, etc. In this example, the crypto token 226 includes a plurality of parameters 422 which may be written within the crypto token 226, or stored on a separate storage and linked via a hash or other identifier programmed within the crypto token 226. In this example, the parameters 422 identify an issuer, a receiver, and one or more requirements for redeeming an underlying value of the crypto token 226. In some cases, the parameters 422 may also identify what type of assets the crypto token value represents, and may include onward transfer options. In some cases, the parameters 422 may also include a limit on geographical use, identify security interests taken by the receiver, applicable laws, privacy regulations, mediation rules, and the like.

The crypto token 226 further includes at least one portion 424 of a content 424. The content-portion 424 can be encrypted in one or more embodiments of the present invention. The encryption can be performed using any known or later developed encryption techniques. The content-portion 424 can be a portion of an audio, video, image, text, webpage, or any other such digital content. For example, the content-portion 424 can be an episode from a show (audio or video) that includes a series of such episodes. Alternatively, or in addition, the content-portion 424 can be a part of an episode of the show, or a part of a movie, etc. Alternatively, or in addition, the content-portion 424 can be part of an image. Alternatively, or in addition, the content-portion 424 is part of book, or a book from a series of books, etc. In yet other examples, the content-portion 424 is a prediction about an event, for example, a live event. For example, the prediction can be about a sports event, reality tv, concert, theater, news, elections, or any other such event.

Further, the crypto token 226 includes a content reveal information 426. The content reveal information 426 can provide one or more conditions when the content-portion 424 can be revealed. Until one or more conditions in the content reveal information 426 are met, the content-portion 424 is kept encrypted, without decryption information being released. The content reveal information 426 can also include an expiration date and/or time, at which the content-portion 424 is scheduled to be revealed. In some embodiments of the present invention, the content-portion 424 is revealed at the expiration date, regardless of the conditions being met. In one or more embodiments of the present invention, the content reveal information 426 can include one or more forecast reveal equations. Based on the forecast reveal equations, the content reveal time for the content-portion 424 can dynamically change.

The crypto token 226 further includes a grid link 428. The grid link 428 is used to link or connect a pair of crypto tokens 226. The grid link 428 may connect a first crypto token 226 to a second crypto token 226 that has a similar content-portion 424. The content-portions 424 can be deemed to be similar by determining a similarity score, and comparing the similarity score to a predetermined threshold. Alternatively, or in addition, the grid link 428 may connect a pair of crypto tokens 226 that are similar to each other (not just the content-portions 424). Alternatively, or in addition, the grid link 428 may indicate a sequence in which the content-portions 424 are to be released. In other examples, the grid link 428 may connect crypto tokens 226 that are to be released (i.e., content-portions revealed) at the same time. Two or more crypto tokens can be connected using the grid link 428 for several other reasons than those described above.

The grid link 428 of the first crypto token 226 can include a unique identifier of the second crypto token 226 to indicate a link between the first crypto token 226 and the second crypto token 226. In one or more embodiments of the present invention, the grid link 428 is one-way, e.g., the first crypto token 226 is connected to the second crypto token 226, but the second crypto token 226 may not be connected to the first crypto token 226. Instead, in one or more embodiments of the present invention, the second crypto token 226 may be connected to a third crypto token 226 via the grid link 428 of the second crypto token 226. The connected crypto tokens 226 can be referred to as a "grid."

Figure 4:
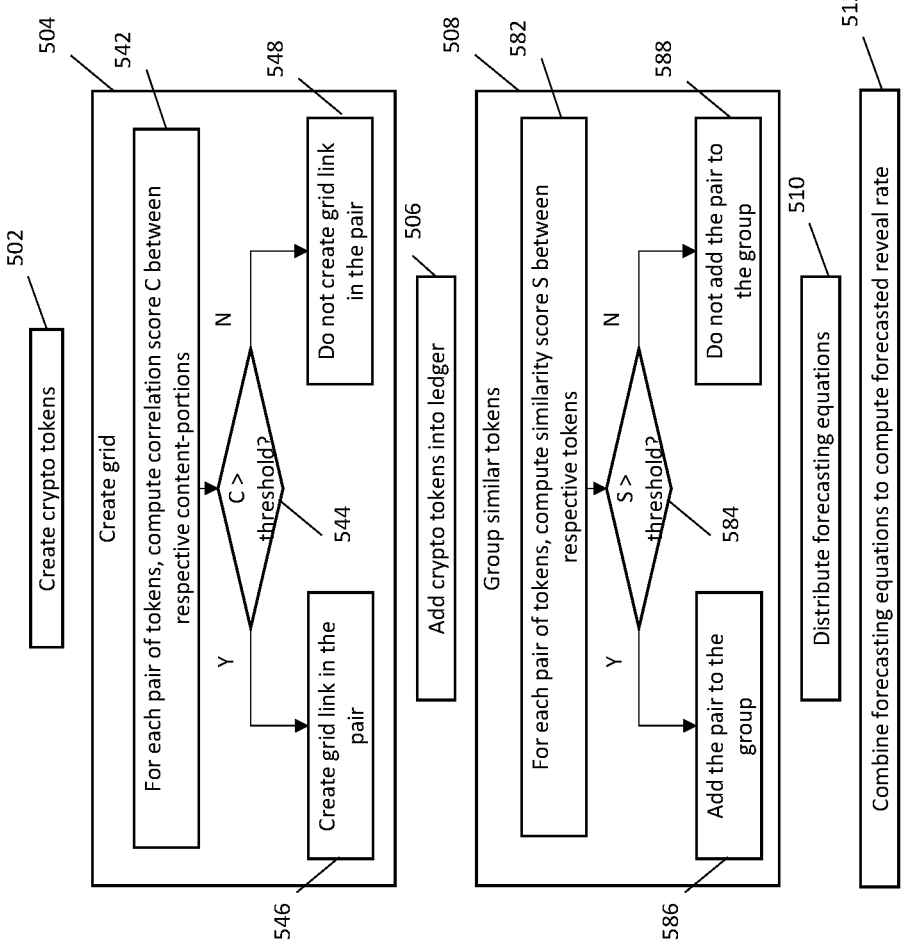
FIG. 4 depicts a flowchart of a method to create and use a grid of crypto tokens to manage reveal of one or more content portions according to one or more embodiments of the present invention.
Figure 5:
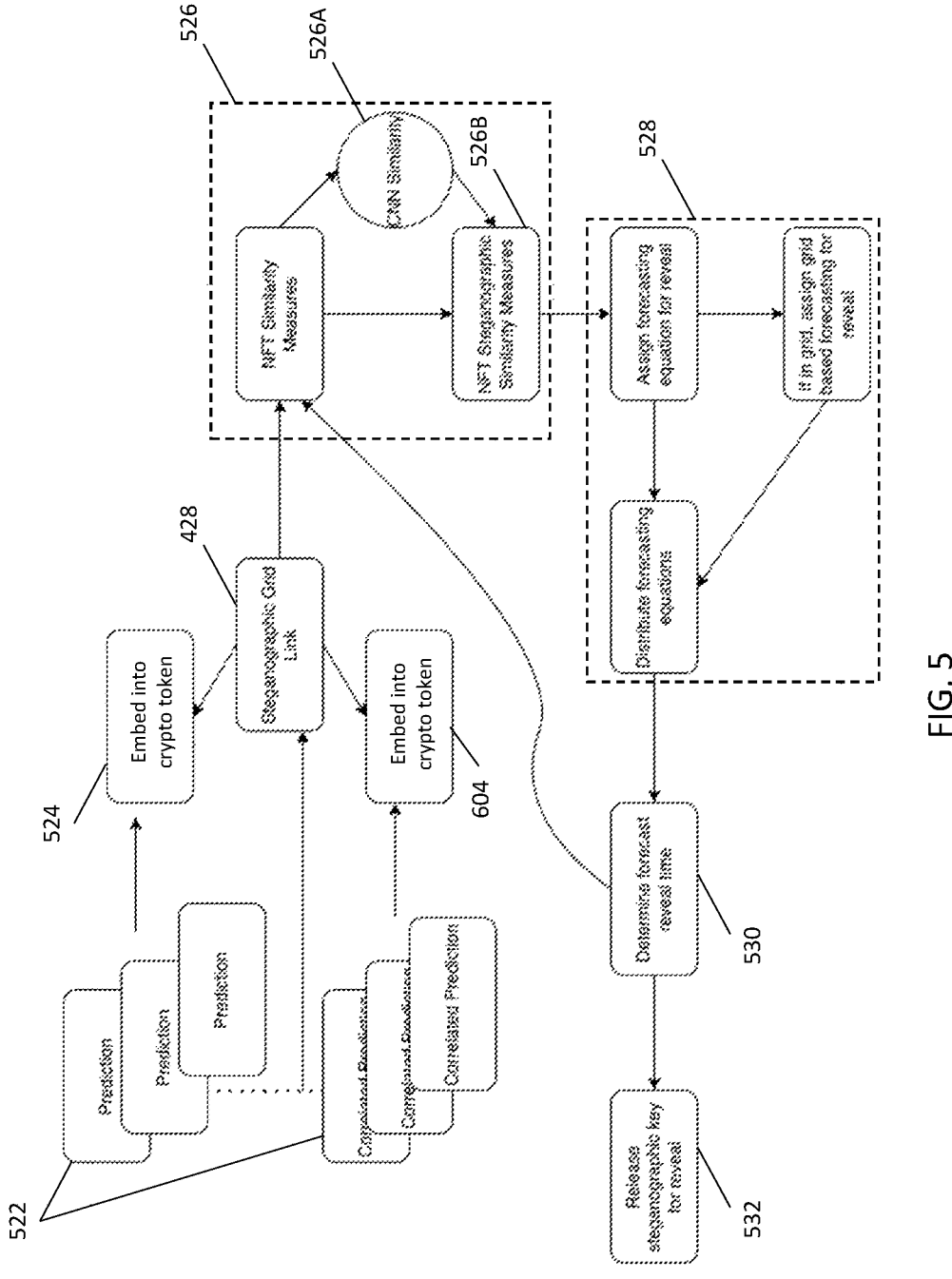
FIG. 5 depicts a dataflow diagram of applying the method in an example scenario where a grid of crypto tokens is used to capture several predictions and to reveal the predictions at an appropriate time in the future.

FIG. 4 depicts a flowchart of a method to create and use a grid of crypto tokens to manage reveal of one or more content portions according to one or more embodiments of the present invention. FIG. 5 depicts a dataflow diagram 600 of applying the method 500 in an example scenario where a grid of crypto tokens 226 is used to capture several predictions 522 and to reveal the predictions at an appropriate time in the future. The flowchart of method 500 and the dataflow diagram 600 are described in parallel further below.

The method 500 includes generating several crypto tokens 226, at block 502. The crypto tokens 226 respectively include the content-portion 424. In one or more embodiments of the present invention, the content-portion 424 is encrypted. In the dataflow diagram 600, the crypto tokens 226 are created (524) with one or more predictions (522) as the respective content-portions 424. The predictions (522) can be encrypted, for example, using one or more steganographic techniques. The predictions (522) can be about a tennis match, for example, winner/loser, scores, shot selections, or any other statistics. The predictions (522) can be about any other event as noted herein, the tennis match is merely one illustrative scenario used herein.

At block 504, a grid of the crypto tokens 226 is created. Creating the grid includes, computing a correlation score between content-portions 424 of each respective pair of crypto tokens 226 (a first token and a second token), at block 542. In response to the correlation score between the respective content-portions 424 exceeding a predetermined correlation threshold, a grid link is created between the first token and the second token, at 544 and 546. If the correlation score does not satisfy the predetermined correlation threshold (e.g., 0.6, 0.8, etc.), the grid link 428 is not created between the first token and the second token, at 548.

The correlation score can be computed using one or more known techniques to compare two content-portions 424. In one or more embodiments of the present invention, depending on the type of the content-portions 424 (e.g., image, video, audio, text, etc.) the correlation can be determined using least-squares, Eigen values, or any other factor associated with the content portion 424. The correlation score can be computed as the Pearson correlation coefficient, linear correlation coefficient, sample correlation coefficient, population correlation coefficient, etc.

Referring to the tennis match scenario, predictions (522) can be made about a tennis match/tournament, such as likelihood to win of one or more players. Other predictions such as a player booming, or busting are correlated and related to the likelihood to win. Each of the predictions (522) are embedded into corresponding crypto tokens 226. A grid link 428 is produced by measuring the correlations between the predictions (522) to create links between the crypto tokens 226. In one or more embodiments of the present invention, the links are embedded into the edges of the NFT's in a steganographic manner at the associated core steganographic image. The "edges" of a token 226 are the pixels that outline the image that is included in the token 226. On each of the pixels that make up the edge (i.e., border) of the image, a part of a path to another token 226 is stored. In other embodiments, the paths are stored as part of a different set of pixels of the image, for example, the pixels in the vicinity of the center of the image, or only odd-numbered pixel in each row of the image, or only even-numbered pixel in each row of the image, or any other pattern or a combination thereof. The selection of the which pixels are used storing the edge data in the image using steganography is not publicly disclosed. The crypto token 226 accordingly has multiple embedded predictions and adjacency encodings embedded into the edges.

At block 506, the crypto tokens 226 are added into the ledger, i.e., blockchain 410. The crypto tokens 226 are added to the ledger 410 using known or later developed techniques.

At block 508, the crypto tokens 226 that are added into the ledger 410 are grouped based on similarity. Creating the group includes, computing a similarity score between each respective pair of crypto tokens 226 after the addition onto the ledger, at 582. In response to the similarity score between the first token and the second token exceeding a predetermined similarity threshold, and the first token and the second token being connected by the grid link 428, adding the first token and the second token to the group, at 584 and 586. If the similarity score does not satisfy the predetermined similarity threshold (e.g., 0.6, 0.8, etc.), the pair of tokens is not grouped, at 588.

In one or more embodiments of the present invention, two levels of similarity are measured. For example, each crypto token 226 is compared to every other crypto token 226 for a similarity score using an algorithm, such as Convolutional Neural Network (CNN) (606A). A second level similarity is created for window based bit level deepening that hides content-portions 424 (e.g., steganographic images, audio, etc.) (606B). The two levels of similarity are combined (e.g., averaged, median, etc.) to determine the final similarity score between each pair of crypto tokens 226.

The most similar crypto tokens 226 are grouped together to forecast when a target crypto token 226 should be revealed. In one or more embodiments of the present invention, the when and what token should be processed to reveal a hidden message is pre-selected; the pre-selected token is the target token. In one or more embodiments of the present invention, token owners can put crypto tokens that they own together to create a grid. The grid expands the forecasting capability of reveal rate for the target crypto token 226. In one or more embodiments of the present invention, one of the crypto tokens 226 is selected by a user (or any other entity) as the "target token," which the user would like to view the content of.

At block 510, a series of forecasting equations are distributed to the most similar and grid based neighbors, i.e., crypto tokens 226 that are connected by a grid link 428 and are grouped as being similar. The dataflow diagram 600 shows the distribution of the forecasting equations at 528. Each crypto token 226 is assigned a corresponding forecasting equation. The forecasting equation generates a forecasting distance (k) for the first crypto token 226 in relation to the second crypto token 226 that is linked and grouped with the first crypto token 226. The forecasting equations can be based on any techniques such as straight-line, moving average, simple linear regression, multiple linear regression, etc.

Figure 6:
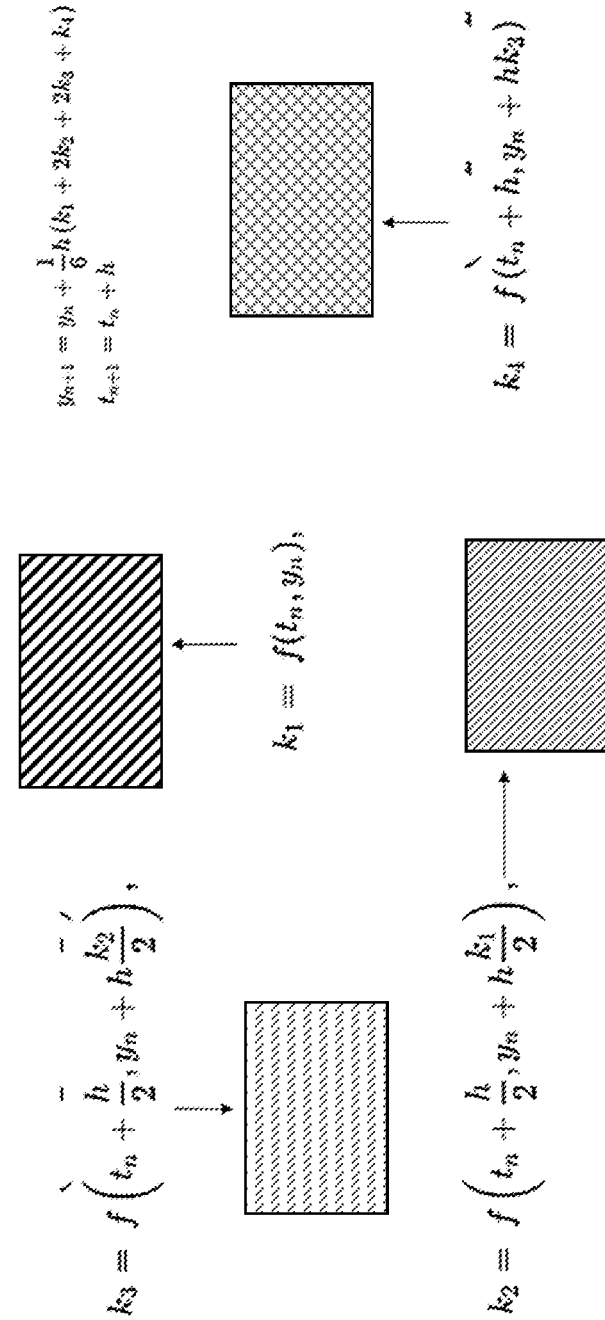
FIG. 6 depicts a picture of an example of distributing forecasting equations according to one or more embodiments of the present invention.

FIG. 6 depicts a picture of an example of distributing forecasting equations according to one or more embodiments of the present invention. The equations depict Runge-Kutta methods used in temporal discretization for the approximate solutions of simultaneous nonlinear equations. However, in other embodiments of the present invention, other implicit and explicit iterative methods, which include the Euler method, can be used. The problem of distributing the forecasting equations can be mapped to the Runge-Kutta (RK4) method, where initial value problem can be specified as follows:

$$\frac{dy}{dt} = f(t, y), y(t_0) = y_0.$$

In a typical RK4 problem expressed by above equation, y is unknown function (scalar or vector) of time t, and y is to be approximated given that the rate at which y changes, is a function of t and of y itself. At the initial time to the corresponding y value is $y_0$. The function f and the initial conditions $t_0$, $y_0$ are known. In one or more embodiments of the present invention, the initial conditions can be provided by a user or selected in a pseudo-random/random manner.

A step-size h is selected. In one or more embodiments of the present invention, h can be a predefined value and/or a user configurable value. Using h, following equations are computed for n=0, 1, 2, 3, . . . ;

$$y_{n+1} = y_n + \frac{1}{6}(k_1 + 2k_2 + 2k_3 + k_4)h,$$

$$t_{n+1} = t_n + h$$

The coefficients used can be varied in one or more embodiments of the present invention. Here $y_{n+1}$ is the RK4 approximation of $y(t_{n+1})$, and the next value $y_{n+1}$ is determined by the present value $y_n$ plus the weighted average of four increments, where each increment is the product of the size of the interval, h, and an estimated slope specified by function f on the right-hand side of the differential equation.

In above equations, $k_1$ is the slope at the beginning of the interval, using y (Euler's method); $k_2$ is the slope at the midpoint of the interval, using y and $k_1$; $k_3$ is again the slope at the midpoint, but now using y and $k_2$; $k_4$ is the slope at the end of the interval, using y and $k_3$.

$$k_1 = f(t_n, y_n),$$

$$k_2 = f\left(t_n + \frac{h}{2}, y_n + h\frac{k_1}{2}\right),$$

$$k_3 = f\left(t_n + \frac{h}{2}, y_n + h\frac{k_2}{2}\right),$$

$$k_4 = f(t_n + h, y_n + hk_3).$$

In one or more embodiments of the present invention, the four slopes are averaged. In some examples, greater weight is given to the slopes at the midpoint ($k_2$, and $k_3$) than the slopes at the beginning and at the end of the interval.

Typically, the most similar crypto tokens 226 have lower forecasting distance (k) while the most dissimilar are further out, i.e., larger distance values (k). It is understood that the relationship of the distance value with the similarity can be inversely proportional in other embodiments of the present invention.

Figure 7:
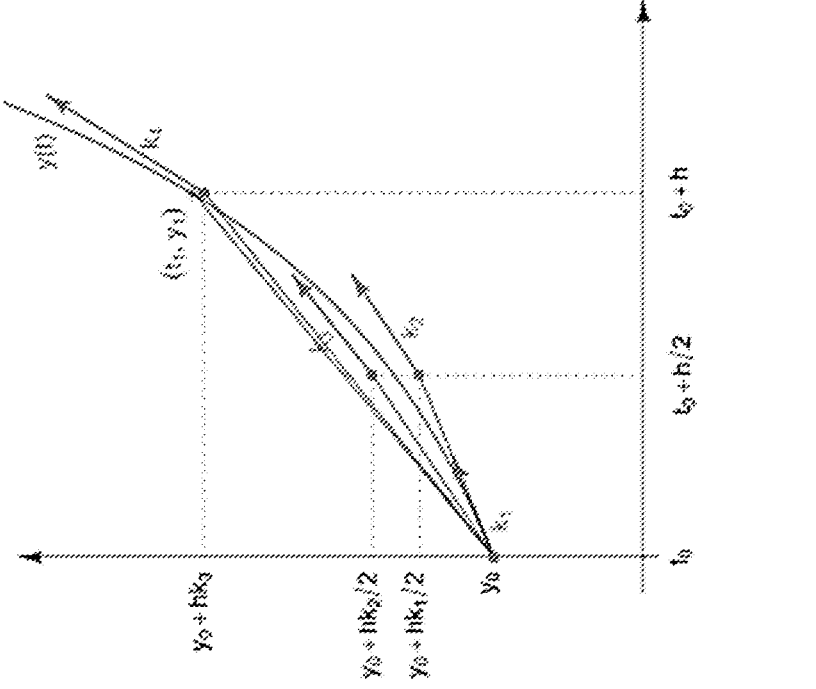
FIG. 7 depicts a combination of the distributed forecasting equations (from FIG. 6) using Runge-Kutta techniques.

At block 512, the forecasts are combined together to compute a forecasted reveal rate (or velocity). In one or more embodiments of the present invention, the forecasted reveal rate is computed using a Runge Kutta method. FIG. 7 depicts a combination of the distributed forecasting equations (from FIG. 6) using Runge Kutta techniques. In other embodiments of the present invention, the combining can be performed using other methods.

The forecast reveal rate is computed for each crypto token 226 by combining the forecasting equations of that crypto token 226 and each of its linked and grouped crypto token 226. The forecast reveal rate of a particular crypto token 226 provides a condition for revealing the content-portion 424 of that particular crypto token 226. The forecast reveal rate can be translated into a specific timepoint (530), e.g., after 10 hours, or 9:30 PM U.S. Eastern Time on Aug. 3, 2022, or the like. The specific timepoint corresponding to the forecast reveal rate is when the content-portion 424 of the crypto token 226 is revealed.

At block 514, if the forecast reveal rate of a crypto token 226 exceeds a predetermined threshold, the content-portion 424 of that particular crypto token 226 is revealed (532). In one or more embodiments of the present invention, the system 100, for example, the token lifecycle management system 120 monitors each crypto token 226 to check if the corresponding forecast reveal rate has exceeded the predetermined threshold. In some embodiments of the present invention, each crypto token 226 can have a corresponding predetermined threshold to compare with the forecast reveal rate.

Revealing the content-portion 424 of the crypto token 226 can include releasing a key to decrypt the content-portion 424 in one or more embodiments of the present invention. In some embodiments, the key is released in the form of another crypto token 226.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 8 depicts a computing environment in accordance with one or more embodiments of the present invention. Computing environment 600 contains an example of an environment for the execution of at least some of the computer code involved in performing the inventive methods, such as the one or more components of the system 100. In addition to block 700, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 700, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 1. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 700 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 700 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The present invention can be a system, a method, and/or a computer program product at any possible technical detail level of integration. The computer program product can include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   generating, using one or more processing units, a plurality of crypto tokens, each crypto token from the plurality of crypto tokens comprising a respective content portion that is encrypted;
   for each pair of crypto tokens from the plurality of crypto tokens comprising a first crypto token and a second crypto token, in response to a correlation score between content portions of the first crypto token and the second crypto token exceeding a predetermined correlation threshold, creating, using the one or more processing units, a grid link between the first crypto token and the second crypto token;
   storing, using the one or more processing units, the plurality of crypto tokens into a ledger;
   creating, using the one or more processing units, a group of crypto tokens from the plurality of crypto tokens that are added into the ledger, creating the group comprises:
      for the each pair of crypto tokens after the release onto the ledger, in response to a similarity score between the first crypto token and the second crypto token exceeding a predetermined similarity threshold, and the first crypto token and the second crypto token being connected by the grid link, adding the first crypto token and the second crypto token to the group;
   distributing, using the one or more processing units, a series of forecasting equations to the group of crypto tokens;
   generating, using the one or more processing units, a forecast reveal rate based on the series of forecasting equations;
   in response to the forecast reveal rate meeting a forecast threshold, generating, using the one or more processing units, a key for revealing at least one content portions embedded in the group of crypto tokens; and
   releasing, using the one or more processing units, the key to decrypt the at least one content portion.

2. The computer-implemented method of claim 1, wherein creating the grid link between the first crypto token and the second crypto token comprises embedding an identifier of the second crypto token in the first crypto token, and embedding an identifier of the first crypto token in the second crypto token.

3. The computer-implemented method of claim 2, wherein the first crypto token is further embedded with an adjacency encoding and multiple parts of the content portion.

4. The computer-implemented method of claim 1, wherein, the key to decrypt the at least one content portion is released as a crypto token.

5. The computer-implemented method of claim 1, wherein, the content portion of the first crypto token comprises a first prediction about an event from a first user.

6. The computer-implemented method of claim 1, wherein, the series of forecasting equations are used to compute and assign a forecasting distance to each pair of crypto tokens in the group of crypto tokens, the forecasting distance between a pair is inversely proportional to the similarity score between the pair.

7. The computer-implemented method of claim 6, wherein, the forecast reveal rate for the group of crypto tokens is computed by combining the forecasting distance of each pair of crypto tokens in the group of crypto tokens, the combining performed based on a Runge-Kutta method.

8. A system comprising:
   a memory; and
   a processor coupled to the memory, the processor configured to perform a method comprising:
      generating a plurality of crypto tokens, each crypto token from the plurality of crypto tokens comprising a respective content portion that is encrypted;
      for each pair of crypto tokens from the plurality of crypto tokens comprising a first crypto token and a second crypto token, in response to a correlation score between content portions of the first crypto token and the second crypto token exceeding a predetermined correlation threshold, creating a grid link between the first crypto token and the second crypto token;

adding the plurality of crypto tokens into a ledger;

creating a group of crypto tokens from the plurality of crypto tokens that are added into the ledger, creating the group comprises: for the each pair of crypto tokens after the release onto the ledger, in response to a similarity score between the first crypto token and the second crypto token exceeding a predetermined similarity threshold, and the first crypto token and the second crypto token being connected by the grid link;

distributing a series of forecasting equations to the group of crypto tokens;

generating a forecast reveal rate based on the series of forecasting equations;

in response to the forecast reveal rate meeting a forecast threshold, generating a key for revealing at least one content portions embedded in the group of crypto tokens; and releasing the key to decrypt the at least one content portion.

9. The system of claim 8, wherein, creating the grid link between the first crypto token and the second crypto token comprises embedding an identifier of the second crypto token in the first crypto token, and embedding an identifier of the first crypto token in the second crypto token.

10. The system of claim 9, wherein the first crypto token is further embedded with an adjacency encoding and multiple parts of the content portion.

11. The system of claim 8, wherein, the key to decrypt the at least one content portion is released as a crypto token.

12. The system of claim 8, wherein, the content portion of the first crypto token comprises a first prediction about an event from a first user.

13. The system of claim 8, wherein, the series of forecasting equations are used to compute and assign a forecasting distance to each pair of crypto tokens in the group of crypto tokens, the forecasting distance between a pair is inversely proportional to the similarity score between the pair.

14. The system of claim 13, wherein, the forecast reveal rate for the group of crypto tokens is computed by combining the forecasting distance of each pair of crypto tokens in the group of crypto tokens, the combining performed based on a Runge-Kutta method.

15. A computer program product comprising a memory device with computer-executable instructions therein, the computer-executable instructions when executed by a processing unit perform a method comprising:

generating a plurality of crypto tokens, each crypto token from the plurality of crypto tokens comprising a respective content portion that is encrypted;

for each pair of crypto tokens from the plurality of crypto tokens comprising a first crypto token and a second crypto token, in response to a correlation score between content portions of the first crypto token and the second crypto token exceeding a predetermined correlation threshold, creating a grid link between the first crypto token and the second crypto token;

adding the plurality of crypto tokens into a ledger;

creating a group of crypto tokens from the plurality of crypto tokens that are added into the ledger, creating the group comprises: for the each pair of crypto tokens after the release onto the ledger, in response to a similarity score between the first crypto token and the second crypto token exceeding a predetermined similarity threshold, and the first crypto token and the second crypto token being connected by the grid link;

distributing a series of forecasting equations to the group of crypto tokens;

generating a forecast reveal rate based on the series of forecasting equations;

in response to the forecast reveal rate meeting a forecast threshold, generating a key for revealing at least one content portions embedded in the group of crypto tokens; and releasing the key to decrypt the at least one content portion.

16. The computer program product of claim 15, wherein, creating the grid link between the first crypto token and the second crypto token comprises embedding an identifier of the second crypto token in the first crypto token, and embedding an identifier of the first crypto token in the second crypto token.

17. The computer program product of claim 16, wherein the first crypto token is further embedded with an adjacency encoding and multiple parts of the content portion.

18. The computer program product of claim 15, wherein, the key to decrypt the at least one content portion is released as a crypto token.

19. The computer program product of claim 15, wherein, the content portion of the first crypto token comprises a first prediction about an event from a first user.

20. The computer program product of claim 15, wherein, the series of forecasting equations are used to compute and assign a forecasting distance to each pair of crypto tokens in the group of crypto tokens, the forecasting distance between a pair is inversely proportional to the similarity score between the pair.

* * * * *